3,329,625
DEFOAMING CLEANING CAKE
Orville D. Hoxie, Grand Rapids, Mich., assignor to Bissell Inc., Grand Rapids, Mich., a corporation of Michigan
No Drawing. Filed Jan. 11, 1961, Ser. No. 81,959
5 Claims. (Cl. 252—358)

This invention relates to a defoaming composition and more particularly to a defoaming cake to be employed in a cleaning device for reducing the foaming action of a detergent solution.

In a floor cleaning device for cleaning lineoleum and tile floors and the like, an aqueous detergent solution is dispensed onto the floor from a storage tank in the device. After scrubbing the detergent solution over the floor surface, the dirty water is drawn upwardly from the floor and discharged into a second tank or compartment. The action of drawing the water from the floor produces considerable aeration and turbulence and thereby large quantities of foam are generated in the return solution. If the foam is not controlled, the foam level in the return tank will rise to the level where it will be expelled from the device through the air louvers of the fan or blower at the top of the apparatus.

To control the foam action in a floor cleaning device such as this, a defoaming material is generally employed, and the dirty water being drawn from the floor is discharged or directed against the defoaming material to thereby decrease the foaming effect.

The present invention is directed to a defoaming cake to be used in conjunction with a floor cleaning device. The dirty water being drawn upwardly from the floor surface by the action of a suction fan is directed against the defoaming cake which reduces the foaming action of the detergent. The defoaming cake controls the foaming action whereby the rate of foam collapse overbalances the foam generation so that the net result is reduced foam generation.

The defoaming cake of the invention is a solid bar which is composed of finely divided particles of a defoaming agent which are dispersed in a homogeneous phase consisting of an organic hardener and an emulsifier. The defoaming cake has a controlled rate of erosion and/or solubility so that it will slowly erode under the impinging action of the dirty water being drawn upwardly from the floor. In addition, as the material can be cast in cake form, it can be readily handled.

The defoaming agent is dispersed throughout the cake and provides a defoaming action which counteracts the rate of foam formation to thereby minimize the foam level.

The defoaming cake of the invention has the following general composition by weight:

| | Percent |
|---|---|
| Defoaming agent | 2–50 |
| Organic hardener | 5–35 |
| Emulsifier | 25–75 |

A specific example of the defoaming cake falling within the above range of composition is as follows in weight percent:

| | Percent |
|---|---|
| Defoaming agent | 30 |
| Organic hardener | 25 |
| Emulsifier | 45 |

The defoaming agent to be employed in the cake of the invention can be any of the common defoaming materials which are employed to control or counteract foam generation. The anti-foaming component may take the form of dimethylpolysiloxane which has the general formula:

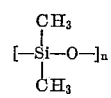

wherein $n$ is an integer having a value of 10 to 1,000,000 which will produce a material having a viscosity in the range of 1 to 1,000,000 centistokes. This material is inert, stable and extremely resistant to oxidation. To increase the defoaming action, small amounts of finely divided colloidal silica can be added to the dimethylpolysiloxane and this material is sold under the trade name of "Dow-Corning Anti-Foam A" and is covered by U.S. Patent 2,632,736.

In addition to the dimethylpolysiloxane, defoaming materials having acetylenic groups can be employed. These materials are generally ditertiary acetylenic glycols such as those sold under the trade names of Surfynol 104A and 104E produced by the Air Reduction Company. Generally, the ditertiary acetylenic glycol, which is a solid, is used. In addition, the ditertiary acetylenic glycol can also be obtained as a 50% solution in 2-ethyl hexanol, tributyl phosphate and also as an 85% solution in equal parts of ethylene glycol and water.

Specific examples of ditertiary acetylenic glycols which can be employed are as follows: 2,5-dimethyl-3-hexyne-2,5-diol; bis(1-hydroxycyclohexyl) acetylene; 2,5-diphenyl-3-hexyne-2,5-diol; and the like.

In addition to the above mentioned materials, defoaming agents such as the phosphate esters, including tributyl phosphate and tributyl thiophosphate, may be employed either separately or in combination with the other defoaming agents.

The action of the defoaming agent in depressing the foam characteristics is of a physical nature. The dispersed particles of the defoaming agent in the solidified cake provide a multiplicity of sites which act to increase the surface tension of the water and interfere with bubble formation, thereby reducing foaming characteristics.

The organic hardener employed in the composition is a wax-like material which will provide a cake or bar of controlled hardness at ordinary room temperatures. The hardener is a material relatively insoluble in water, having a melting point in the range of 40° to 100° C. and is compatible with the other ingredients of the defoaming cake.

Examples of hardeners which can be employed are tallow alcohol, a naturally occurring material which is a combination of cetyl and oleyl alcohols; cetyl alcohol; oleyl alcohol; synthetic petroleum wax; and natural wax. In addition, glycol esters such as ethylene glycol monostearate, diethylene glycol monostearate, propylene glycol monostearate and glycerol monostearate can also be employed.

The emulsifier is a water soluble polyalkylene glycol ester or an ethylene oxide-propylene oxide polymer generally having a melting point in the range of 50° to 100° C. and which is miscible with the organic hardener to provide a continuous homogeneous phase with the defoaming agent being dispersed within the homogeneous phase.

The polyalkylene glycol ester has a molecular weight in the range of 200 to 6000 and is produced by the reaction of the glycol with a fatty acid having from 12 to 18 carbon atoms. Examples of the polyalkylene glycol esters which can be employed are polyethylene glycol-1000-monostearate; polyethylene glycol-600-distearate; polyethylene glycol-1000-mono-oleate; polyethylene glycol-4000-dioleate and the like.

The ethylene oxide-propylene oxide polymer is a material, such as Pluronic F68, manufactured by the Wyandotte Chemical Company, which has the following general formula:

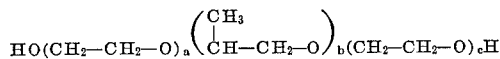

where $a$, $b$ and $c$ are selected so that the molecular weight of the compound is within the range of 3000 to 11,000. The ethylene oxide groups are in the range of 70 to 80% of the total weight of the material.

The defoaming cake of the invention is prepared by initially melting the ingredients together at a temperature below the decomposition temperature for any one of the ingredients. The melting temperature is generally in the range of 150° to 200° F. The melted materials are then blended with high speed to develop a good dispersion of the defoaming particles within the solution. After the defoaming material is completely dispersed, the mixture is cast into the desired shape and preferably quenched to prevent segregation, coagulation and migration of the ingredients. It has been found that the proper quenching effect can be obtained by casting the molten solution into cold or refrigerated molds. This not only provides a rapid solidification to prevent segregation, but also speeds up the overall casting operation and permits handling of the cakes after a shorter period of time.

Examples of the preparation of the composition of the invention are as follows:

Example 1

Twenty-seven parts by weight of tallow alcohol were melted with 30 parts by weight of Dow-Corning Anti-Foam A and 43 parts by weight of Pluronic F86 at a temperature of 180° F. The materials were blended with high speed and high shear agitation and subsequently cast into a refrigerated plastic mold to form a small cake.

Example 2

A defoaming cake was prepared in the manner according to Example 1 and in this case 20 parts of ethylene glycol monostearate were melted with 50 parts by weight of Surfynol 102, which is a ditertiary acetylenic glycol produced by the Air Reduction Company, and 30 parts by weight of polyethylene glycol-6000-monostearate. The resulting material, after agitation, was cast into the form of a bar in a refrigerated mold.

Example 3

Thirty parts by weight of Dow-Corning Anti-Foam A were melted with 5 parts of 122° F. petroleum wax and 75 parts by weight of polyethylene glycol-4000-dioleate. The resulting molten material was cast into a refrigerated aluminum mold to form a cake.

The defoaming cake of the invention has a controlled erosion rate which is specifically designed for use in a floor cleaning device in which the aqueous detergent solution is drawn upwardly by means of a suction fan and is directed into contact with the defoaming cake. Generally, the erosion rate of the cake is 3 to 10 grams per hour under conditions of continuous impingement with the aqueous solution at 70° F. and at a total volume liquid flow rate of 13 gallons per hour.

The defoaming agent which is dispersed throughout the cake provides an effective defoaming action which will reduce the foam generation of low surface tension aqueous detergent systems and prevent excessive quantities of foam from developing.

Various modes of carrying out the invention are contemplated as being within the scope of the following claims particularly pointing out and distinctly claiming the subject matter which is regarded as the invention.

I claim:

1. A solid defoaming cake for controlling the foaming action of an aqueous detergent solution, consisting essentially of 5% to 35% by weight of a wax-like hardening material having a melting point in the range of 40° C. to 100° C. and being selected from the group consisting of tallow alcohol, cetyl alcohol, oleyl alcohol, synthetic petroleum wax, natural wax and alkylene glycol fatty acid esters, 25% to 75% by weight of a water soluble substance miscible with said wax-like hardening material to provide a homogeneous phase and having the formula:

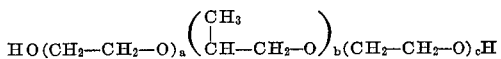

where $a$, $b$ and $c$ are integers having values sufficient to provide the substance with a molecular weight in the range of 3000 to 11,000 and the radicals $(CH_2—CH_2—O)_a$ and $(CH_2—CH_2—O)_c$ comprise 70% to 80% by weight of the substance, and 2% to 50% by weight of finely divided particles of dimethyl polysiloxane suspended within the homogeneous phase and having the formula:

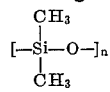

where $n$ is an integer having a value of 10 to 1,000,000, said solid cake having a controlled rate of erosion when contacted with an aqueous detergent solution whereby the dimethyl polysiloxane is progressively released to effectively reduce the foam generation of the aqueous detergent solution.

2. A method of controlling the foaming action of an aqueous solution of a surface active agent, comprising the step of directing a stream of the solution against a solid cake consisting essentially of 5% to 35% by weight of a wax-like hardening material having a melting point in the range of 40° C. to 100° C. and being selected from the group consisting of tallow alcohol, cetyl alcohol, oleyl alcohol, synthetic petroleum wax, natural wax and alkylene glycol fatty acid esters, 25% to 75% by weight of a water soluble substance miscible with said wax-like hardening material to provide a homogeneous phase and having the formula:

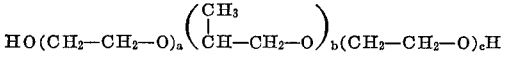

where $a$, $b$ and $c$ are integers having values sufficient to provide the substance with a molecular weight in the range of 3,000 to 11,000 and the radicals

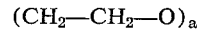

and $(CH_2—CH_2—O)_c$ comprise 70% to 80% by weight of the substance, and 2% to 50% by weight of finely divided particles of dimethyl polysiloxane suspended within the homogeneous phase and having the formula:

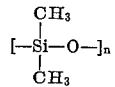

where $n$ is an integer having a value of 10 to 1,000,000, said solid cake having a controlled rate of erosion to progressively release the foaming agent to reduce foam generation of the solution.

3. A solid defoaming cake for controlling the foaming action of an aqueous detergent solution, consisting essentially of 5 to 35% by weight of a wax-like hardening material having a melting point in the range of 40 to 100° C. and being selected from the group consisting of tallow alcohol, cetyl alcohol, oleyl alcohol, synthetic petroleum wax, natural wax and alkylene glycol fatty acid esters, 25 to 75% by weight of a water soluble substance miscible with said wax-like hardening material to provide a homogeneous phase and selected from the group consisting of:

(a) 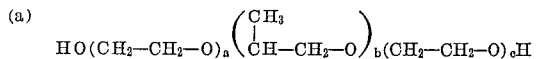

where $a$, $b$ and $c$ are integers having values sufficient to provide the substance with a molecular weight in the range of 3,000 to 11,000 and the radicals

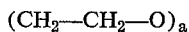

and $(CH_2-CH_2-O)_c$ comprise 70 to 80% by weight of the substance, (b) a polyalkylene glycol fatty acid ester having a molecular weight of 200 to 6,000 and having a melting point in the range of 50 to 100° C. and 2 to 50% by weight of finely divided particles of dimethyl polysiloxane suspended within the homogeneous phase and having the formula:

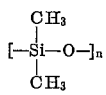

where $n$ is an integer having a value of 10 to 1,000,000, said solid cake having a controlled rate of erosion when contacted with an aqueous detergent solution whereby the dimethyl polysiloxane is progressively released to effectively reduce the foam generation of the aqueous detergent solution.

4. A solid defoaming cake for controlling the foaming action of an aqueous detergent solution, consisting essentially of 5 to 35% by weight of a wax-like hardening material having a melting point in the range of 40 to 100° C. and being substantially insoluble in water, 25 to 75% by weight of a water soluble substance miscible with said wax-like hardening material to provide a homogeneous phase and selected from the group consisting of:

(a) 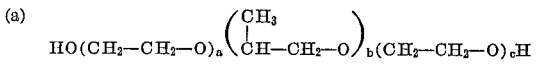

where $a$, $b$ and $c$ are integers having values sufficient to provide the substance with a molecular weight in the range of 3,000 to 11,000 and the radicals

and $(CH_2-CH_2-O)_c$ comprise 70 to 80% by weight of the substance, (b) a polyalkylene glycol fatty acid ester having a molecular weight of 200 to 6,000 and having a melting point in the range of 50 to 100° C. and 2 to 50% by weight of finely divided particles of dimethyl polysiloxane suspended within the homogeneous phase and having the formula:

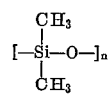

where $n$ is an integer having a value of 10 to 1,000,000, said solid cake having a controlled rate of erosion when contacted with an aqueous detergent solution whereby the dimethyl polysiloxane is progressively released to effectively reduce the foam generation of the aqueous detergent solution.

5. The cake of claim 1 and having dispersed therein finely divided particles of colloidal silica.

References Cited

UNITED STATES PATENTS

| | | | |
|---|---|---|---|
| 2,632,736 | 3/1953 | Currie | 252—49.6 X |
| 2,668,150 | 2/1954 | Luvisi | 252—358 X |
| 2,727,867 | 12/1955 | Denman | 252—358 X |
| 2,843,551 | 7/1958 | Leonard et al. | 252—358 |
| 2,868,731 | 1/1959 | Henderson et al. | 252—11 |
| 2,997,447 | 8/1961 | Russell et al. | 252—358 X |
| 3,200,080 | 8/1965 | Martin et al. | 252—358 |

OTHER REFERENCES

The Surfynols, pub. by Air Reduction Chemical Co., NPD–080507, pp. 1–3 and 17.

LEON D. ROSDOL, *Primary Examiner.*

JULIUS GREENWALD, *Examiner.*

R. D. LOVERING, J. T. FEDIGAN,
*Assistant Examiners.*